Nov. 15, 1960    M. T. RODINE    2,960,015
METHOD AND MEANS FOR MAKING CIRCULAR VARIABLE DENSITY FILTERS
Filed Sept. 24, 1956

Milward T. Rodine,
INVENTOR.

BY

ATTORNEY

United States Patent Office 2,960,015
Patented Nov. 15, 1960

2,960,015

METHOD AND MEANS FOR MAKING CIRCULAR VARIABLE DENSITY FILTERS

Milward T. Rodine, St. Peter, Minn., assignor to Hughes Aircraft Company, Culver City, Calif., a corporation of Delaware Filed Sept. 24, 1956, Ser. No. 612,911

8 Claims. (Cl. 95—1)

The present invention relates to optical filters and more particularly to an improved method and means for producing circular optical filters in which the transmissivity varies in a predetermined manner across each diameter of the filter.

Circular optical filters in which the transmissivity of each area of the filter is a function of the distance of that area from the center of the filter have been used in the optical simulation of radar, and in radiant energy guidance systems. In such uses, the radiant energy source serves as a target and a photo-electric seeker head is used to search for and "lock-on" to this target. By using a circular variable density filter in the seeker head the relative intensity of the radiant energy passing through the filter can be used to provide target information.

The filters which have been used in the past for radiant energy guidance systems and in systems for simulating radar have been produced by drawing a series of concentric black circles on white paper with the relative widths of the resulting black and white rings being determined by the specific target information which is desired from the radiant energy passing through the filter. Such drawings are made on a large scale and then photographed. The resulting photographic image thus has the desired transmissivity characteristics and can be of any desired size.

Although such methods have proven satisfactory in the final result, a great deal of work is required in computing the desired concentric ring pattern and also in the construction of the pattern. In addition, such patterns satisfy only one configuration and the work must be repeated for each additional filter representing a new configuration. At the present time rectangular (or longitudinal) filters which have a longitudinal variation in transmissivity are available, but cannot be used in the present guidance systems.

It is therefore an object of the present invention to provide an improved method and means for producing a circular optical filter having a radial variation in transmissivity.

It is a further object of the present invention to provide an improved method of converting a longitudinal optical filter to a circular optical filter using photographic techniques.

Another object of the present invention is to provide a new and novel device for producing circular optical filters having any desired predetermined radial variation in transmissivity.

In accordance with the present invention a rectangular shaped optical filter having a longitudinal variation in transmissivity is placed over a sectorial aperture in a planar filter holder. A sheet of unexposed film is then mounted on a turntable which rotates about an axis which passes through the apex of the sectorial aperture, with the unexposed film being in close proximity to the aperture. As the sheet of sensitized film is rotated, the sectorial aperture is uniformly illuminated throughout an integral number of revolutions, which causes the unexposed film to become exposed in accordance with the transmissivity of the filter. In this way the intensity of radiant energy impinging upon any area of the film is determined by the distance of that area from the axis of rotation and a circular optical filter results. Although it might be found more practical to rotate the sensitized film, it is also possible to rotate the sectorial aperture and filter while maintaining the film in a fixed position.

The novel features of this invention as well as the invention itself will be more clearly understood when read in conjunction with the accompanying drawings in which.

Figure 1:
Fig. 1 illustrates a rectangular strip filter having a longitudinal variation in transmissivity which varies from substantially unity to zero.

In Fig. 1 a rectangular optical filter 10 is shown which has a longitudinal variation in transmissivity that decreases from one edge 11 to the other edge 13. This general type of filter may thus be termed a longitudinal filter. For purposes of illustration this variation in transmissivity is shown as being substantially parabolic. However, this variation in the transmissivity with distance from the one edge, which may be termed a longitudinal variation, may vary in any predetermined manner. A sector 12 of a circle is shown superposed on the longitudinal filter having its apex 14 coincident with the one edge 11 of the filter and the center point of its arc coincident with the other edge 13. Longitudinal filters such as that illustrated, that is, filters having a continuous variation in transmissivity, are commercially available and can also be produced by overlapping in a prescribed manner a number of filters having different transmissivities.

Figure 2:
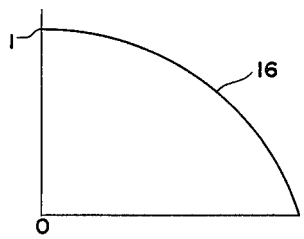
Fig. 2 is a graphical representation of the relative transmissivity of the optical filter shown in Fig. 1, with relative transmissivity plotted along the ordinate and distance from the left hand edge of the filter plotted along the abscissa.
Figure 3:
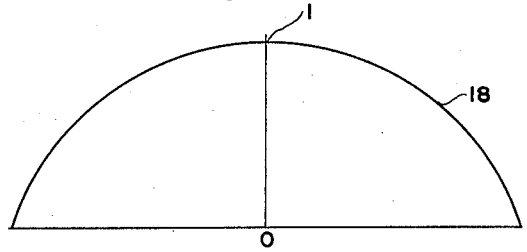
Fig. 3 is a graphical representation of the transmissivity of a circular optical filter produced in accordance with the teachings of the present invention, from the rectangular filter shown in Fig. 1, with relative transmissivity being plotted along the ordinate and distance from the center of the circular filter being plotted along the abscissa.

In Fig. 2 the curve 16 illustrates the relative transmissivity of the filter shown in Fig. 1. It is seen that the transmissivity varies substantially from unity at the one edge to zero at the other edge. Since this filter has a longitudinal variation in transmissivity, lateral areas which are equidistant from the one edge have equal transmissivities. If only the sector 12 of the longitudinal filter is rotated about its apex 14 and simultaneously illuminated in the proper manner to expose a sheet of film which is in close proximity to the sector, the relative transmissivity of a positive from the resulting negative is as shown in the graph of Fig. 3. The curve 18 is substantially what is obtained if the relative transmissivity is plotted versus radial distance from the center of the circular pattern. Thus a circular filter having any desired variation in transmissivity can be made from a longitudinal (or strip) filter having a corresponding longitudinal variation.

Figure 4:
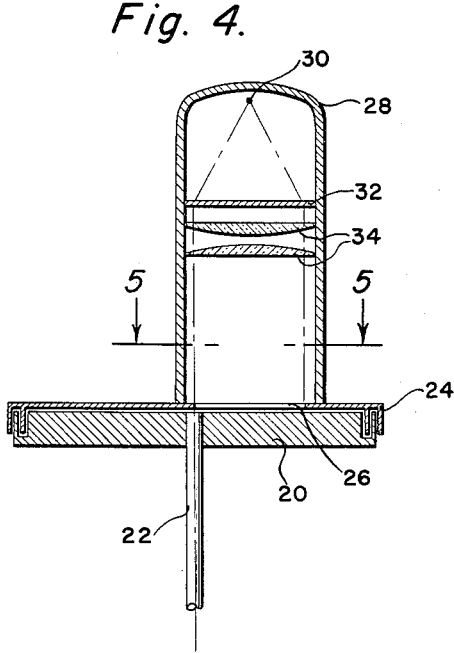
Fig. 4 is a cross section of a device provided in accordance with the present invention to convert a longitudinal optical filter to a circular optical filter.

To produce the above described pattern, the device of Fig. 4 is used. A rotatable film holder 20, or turntable, having a flat surface for holding the unexposed film is shown having an axis of rotation 22. The turntable 20 could be rotated by any suitable means. A filter holder 24 for the longitudinal filter having a flat surface serves to hold the filter in close proximity to the upper surface of the rotatable film holder. The edges of the filter holder 24 and the film holder 20 are so designed that external light does not enter the area in which the unexposed film is placed. The filter holder 24 has an orifice defining a sector of a circle 26 (which is thus a sectorial aperture) across which the longitudinal filter is placed. Since the filter and the unexposed film should be as close to each other as possible (unless an optical system is used between the filter and film to focus the radiant energy upon the film) it may be found most advantageous to attach the filter to the bottom edge of the filter holder 24 across the sectorial aperture 26.

To provide the necessary illumination to expose the film, a source of illumination 28 is shown attached to the filter holder 24. This source of illumination 28 may be any one of a number of well-known sources which provide parallel rays of radiant energy of uniform intensity. The source of illumination 28 should be so positioned that the parallel rays of energy impinge at right angles to the plane of the sectorial aperture 26. For purposes of illustration a light source 30 is shown which provides the necessary radiant energy. The radiant energy from the light source 30 passes through a diffusion plate 32 and thence through a condenser system 34 to provide the parallel rays of energy of equal intensity. The light source 30 may be controlled externally.

In operation, a sensitized photographic plate is placed on the turntable 20 with its emulsion side up. The filter holder 24 and source of illumination 28 are then lowered so that the filter is in juxtaposition with the photographic plate. With the sectorial aperture 26 uncovered, that is, without the filter, the turntable is rotated and the light source then turned on during a finite number of whole revolutions of the turntable (minus the number of degrees in the sectional aperture). The developed plate will provide a constant density along all radii throughout the exposed circular areas. This is due to the fact that in a sector the time of exposure along all concentric arcs is equal. Hence the emulsion density for circular paths of equal radius is equal and the relative transmissivity equal. This uniformity with an open sectorial aperture serves as a test of the system.

With the rectangular variable density filter 10 placed on the filter holder 24 and the same procedure as described above repeated, a circular filter having a radial variation in transmissivity is produced. If the rectangular filter 10 has a continuous longitudinal variation in transmissivity which varies from unity to zero and the filter is so positioned that the edge of the filter having unity transmissivity is coincident with the apex of the sectorial aperture, the resultant circular negative will be a filter having a variation in transmissivity from zero at its center to unity at its periphery. Upon reversal by contact or projection printing the desired variable transmissivity distribution is obtained, that is, a transmissivity of unity at the center and zero at the edge. The same result may of course be obtained upon the exposed negative by turning the rectangular filter end for end. If the rectangular filter is itself a photographic film the best results are obtained by mounting the filter on the bottom side of the sectorial opening 26 with its emulsion face down. This permits a minimum separation of the emulsion face of the rectangular filter and the emulsion face of the sensitized photographic plate carried by the turntable 20.

Figure 5:
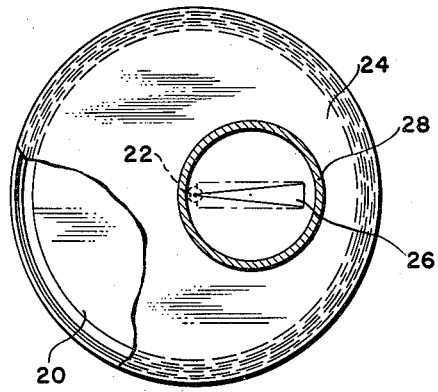
Fig. 5 is an illustration of the longitudinal filter holder which is part of the device shown in Fig. 4.

Fig. 5 is a top view of the area enclosed by the source of illumination 28 of Fig. 2a and shows the relative position of the rectangular filter 10 and the sectorial aperture 26 (the dotted lines indicate the position of the rectangular or strip filter 10). It is clearly seen that the width of the rectangular filter must be at least as great as the chord of the sectorial aperture 26. The angle subtended by the sectorial aperture 26 is not critical, however, it should be as small as possible while avoiding excessive diffraction effects at its apex. It is of course also evident that the strip filter 10 need not be rectangular in shape but must only be of a shape which is sufficient to cover the sectorial aperture 26 and cause a longitudinal variation in the transmissivity of the sectorial aperture along the radius which bisects the angle subtended by the sector.

In converting the rectangular filter 10 having a longitudinal variation in transmissivity into a filter of circular form, it is to be noted that the boundaries of each density pattern (that is, adjacent areas of different transmissivity), even though they become infinitely closely-spaced, become chords of the sectorial aperture 26. Since each particle of the sensitized film travels along an arc as the turntable rotates (preferably at a constant velocity) whereas the boundaries of the longitudinal filter are chords of the sectorial aperture, there is a small overlapping effect produced. This overlapping may be reduced to a minimum by making the sectorial aperture 26 as small as possible, that is, as small as possible without introducing diffraction. By having this sectorial aperture sufficiently small it is in fact found that the overlapping between the arcs and chords is not detrimental to the circular filter.

There has thus been described a method for producing a circular optical filter having a radial variation in transmissivity which can be controlled and which is easily reproduced. There has also been shown a device for converting a longitudinal optical filter having a longitudinal variation in transmissivity into a circular optical filter having a radial variation in transmissivity. The method and the device of the present invention provide a considerable improvement over the prior art for making circular optical filters with radial variations in transmissivity.

What I claim is:

1. A device for making a circular optical filter having a predetermined radial variation in transmissivity from a strip filter having a predetermined longitudinal variation in transmissivity comprising in combination, a rotatable film holder having a central axis, means for rotating said film holder about said axis, a strip filter holder disposed substantially perpendicular to said axis and including an orifice defining a sector of a circle having its apex coincident with said axis, and means for projecting a field of illumination over the entire area of the orifice for uniformly illuminating said sector.

2. The method of making a circular optical filter having a radial variation in transmissivity comprising the steps of: forming a wedge-shaped beam of light having a longitudinal variation in intensity, exposing an unexposed film of light-sensitive material to said wedge-shaped beam of light with the apex thereof coinciding with an axis in said film, and providing relative rotational motion around said axis between said film and said wedge-shaped beam of light.

3. The method of making a circular optical filter having a radial variation in transmissivity comprising the steps of: forming a wedge-shaped beam of light having a longitudinal variation in intensity, projecting said wedge-shaped beam of light onto an unexposed film of light-sensitive material with the apex of said wedge-shaped beam coinciding with an axis in said film, and providing relative rotational motion around said axis between said film and said wedge-shaped beam of light.

4. A device for making a circular optical filter having a predetermined radial variation in transmissivity comprising means for forming a wedge-shaped beam of light having a longitudinal variation in intensity, means for projecting said wedge-shaped beam of light onto an unexposed film of light-sensitive material having an axis coincident with the apex of said wedge-shaped beam of light, and means for providing relative rotational motion around said axis between said film and said wedge-shaped beam of light.

5. A device for making a circular optical filter having a predetermined radial variation in transmissivity comprising means for forming a wedge-shaped beam of light having a longitudinal variation in intensity, means for projecting said wedge-shaped beam of light onto an unexposed film of light-sensitive material, means for holding said unexposed film with an axis thereof coincident with the apex of said wedge-shaped beam of light, and means for providing relative rotational motion around said axis between said circular film and said wedge-shaped beam of light.

6. The invention according to claim 5 wherein said means for holding said film is rotatable and said last-named means includes means for rotating said film-holding means.

7. The invention according to claim 5 wherein said axis is a central axis in said film.

8. The invention according to claim 7 wherein said film is circular.

References Cited in the file of this patent

UNITED STATES PATENTS

| | | |
|---|---|---|
| 1,513,322 | Humphery | Oct. 28, 1924 |
| 2,830,491 | Domeshek | Apr. 15, 1958 |